United States Patent
Lee

(10) Patent No.: US 9,832,340 B2
(45) Date of Patent: Nov. 28, 2017

(54) IMAGE FORMING APPARATUS AND METHOD OF PERFORMING ERROR NOTIFICATION AND ERROR RECOVERY FUNCTIONS IN IMAGE FORMING APPARATUS

(75) Inventor: Kee-chang Lee, Hwaseong-si (KR)

(73) Assignee: S-PRINTING SOLUTION CO., LTD., Suwon-si (KR)

(*) Notice: Subject to any disclaimer, the term of this patent is extended or adjusted under 35 U.S.C. 154(b) by 0 days.

(21) Appl. No.: 13/612,020

(22) Filed: Sep. 12, 2012

(65) Prior Publication Data

US 2013/0155445 A1 Jun. 20, 2013

(30) Foreign Application Priority Data

Dec. 20, 2011 (KR) .................. 10-2011-0138487

(51) Int. Cl.
  *G06K 15/00* (2006.01)
  *H04N 1/32* (2006.01)
  *G06F 11/07* (2006.01)
  *H04N 1/00* (2006.01)
  *G06F 11/14* (2006.01)

(52) U.S. Cl.
  CPC ....... *H04N 1/3263* (2013.01); *G06F 11/0733* (2013.01); *G06F 11/0748* (2013.01); *G06F 11/0793* (2013.01); *H04N 1/00013* (2013.01); *H04N 1/00015* (2013.01); *H04N 1/00042* (2013.01); *H04N 1/00063* (2013.01); *H04N 1/32587* (2013.01); *H04N 1/32593* (2013.01); *H04N 1/32635* (2013.01); *H04N 1/32657* (2013.01); *H04N 1/32662* (2013.01); *H04N 1/32667* (2013.01); *H04N 1/32694* (2013.01); *G06F 11/1438* (2013.01)

(58) Field of Classification Search
  USPC ............................................... 358/1.13–1.16
  See application file for complete search history.

(56) References Cited

U.S. PATENT DOCUMENTS 5,090,830 A * 2/1992 Kroeger ............... G06F 3/1293
  400/719
5,172,246 A * 12/1992 Yoshida ............. H04N 1/32619
  358/405

(Continued)

FOREIGN PATENT DOCUMENTS

JP  6-332643   12/1994
JP  2001-256129  9/2001

(Continued)

OTHER PUBLICATIONS

Extended European Search Report issued Oct. 19, 2012 in corresponding European Patent Application No. 12180790.3.

(Continued)

*Primary Examiner* — Kevin Ky
(74) *Attorney, Agent, or Firm* — Staas & Halsey LLP

(57) ABSTRACT

A method of performing error notification and error recovery functions in an image forming apparatus includes detecting by one or more sub-processors an error of a main processor for controlling the sub-processors; controlling an interface function of the image forming apparatus if the error is detected; outputting information about the detected error; and recovering the detected error by controlling an operation of the main processor.

18 Claims, 7 Drawing Sheets

(56) References Cited

U.S. PATENT DOCUMENTS

| | | | |
|---|---|---|---|
| 5,321,520 A * | 6/1994 | Inga | H04N 1/2179 358/1.9 |
| 5,716,148 A | 2/1998 | Tamagaki | |
| 6,219,153 B1 * | 4/2001 | Kawanabe | B41B 15/00 347/14 |
| 6,631,407 B1 | 10/2003 | Mukaiyama et al. | |
| 6,715,100 B1 * | 3/2004 | Hwang | G06F 11/2035 714/5.1 |
| 6,856,412 B1 * | 2/2005 | Kaneko | 358/1.14 |
| 7,382,477 B2 * | 6/2008 | Wanda | G06F 3/121 358/1.13 |
| 7,774,454 B2 | 8/2010 | Yamasaki et al. | |
| 7,894,086 B2 * | 2/2011 | Ujigawa | H04N 1/00278 358/1.14 |
| 8,014,017 B2 | 9/2011 | Owari | |
| 8,018,624 B2 * | 9/2011 | Li | H04N 1/6033 358/1.9 |
| 8,514,467 B2 * | 8/2013 | Shimada | H04N 1/32609 358/404 |
| 2001/0028473 A1 | 10/2001 | Yamasaki et al. | |
| 2004/0081234 A1 * | 4/2004 | Kajita | G06F 11/263 375/224 |
| 2005/0015684 A1 * | 1/2005 | Nishikawa | G06F 11/0733 714/48 |
| 2005/0134893 A1 * | 6/2005 | Han | G06F 3/121 358/1.14 |
| 2005/0273652 A1 * | 12/2005 | Okawa | G06F 9/505 714/10 |
| 2006/0055972 A1 * | 3/2006 | Saikawa | G06F 3/1235 358/1.16 |
| 2006/0126256 A1 * | 6/2006 | Forest | B60W 50/029 361/139 |
| 2006/0181730 A1 * | 8/2006 | Moore | G06F 3/1209 358/1.15 |
| 2007/0070398 A1 * | 3/2007 | Oshima | H04N 1/00222 358/1.15 |
| 2007/0285709 A1 * | 12/2007 | Yamasaki | G06F 3/1208 358/1.15 |
| 2008/0158587 A1 * | 7/2008 | Owari | 358/1.14 |
| 2008/0255720 A1 * | 10/2008 | Katrak | H04L 12/66 701/32.8 |
| 2009/0201536 A1 * | 8/2009 | Yoda | H04N 1/00875 358/1.15 |
| 2009/0327808 A1 * | 12/2009 | Takizawa | G03G 15/5004 714/24 |
| 2010/0123779 A1 * | 5/2010 | Snyder | G07C 5/0866 348/148 |
| 2011/0199645 A1 * | 8/2011 | Ito | G06F 3/121 358/1.15 |
| 2011/0208986 A1 * | 8/2011 | Soga | G03G 15/5004 713/323 |
| 2012/0084606 A1 * | 4/2012 | Igarashi | 714/37 |
| 2012/0089861 A1 * | 4/2012 | Cardinell et al. | 714/2 |
| 2013/0126042 A1 * | 5/2013 | Dewald | G07F 11/44 141/105 |

FOREIGN PATENT DOCUMENTS

| | | |
|---|---|---|
| JP | 2005-136747 | 5/2005 |
| JP | 2007-286859 | 11/2007 |
| JP | 2008-182690 | 8/2008 |
| JP | 2009-128668 | 6/2009 |
| JP | 2011-60173 | 3/2011 |

OTHER PUBLICATIONS

European Office Action dated Jun. 9, 2015 in European Patent Application No. 12180790.3.
Summons to Oral Proceedings issued Jun. 14, 2017 in related European Patent Application No. 12180790.3.
Korean Office Action dated Sep. 22, 2017, in corresponding Korean Patent Application No. 10-2011-0138487.

* cited by examiner

<JOB STATUS PROTOCOL>

<ERROR STATUS PROTOCOL>

FIG. 4A

-A level Log

| Log Group | Log Item | Where | What | | When | | Who | | How | |
|---|---|---|---|---|---|---|---|---|---|---|
| | | Device Serial Number | Log Group | LogType | Start Date | Start Time | Login ID | Authentication Type | Source | Destination |
| | | X(16) | ENUM | ENUM | Integer YYYY/MM/DD | Integer HH:MM:SS | X(..) | X(..) | X(..) | X(..) |
| Job Log | Print | Serial Number of Device | LOG_GROUP_JOB "Job Log" | LOG_TYPE_JOB_PRINT "Print Job" | Star Datet YYYY/MM/DD | Start Time HH:MM:SS | Login UserID "Local User", "Administrator", UserID | "No Authentication" "Local" "SMB" "Kerberos" "LDAP" | Local(PC Name)or Network(IP Address) (Not DocBox Job) | N/A |
| | | | | | | | | | | N/A |
| | | | | | | | | | | N/A |
| | | | | | | | | | | N/A |
| | | | | | | | | | | N/A |
| | | | | | | | | | Document Path(In case of docbox job) | N/A |
| | | | | | | | | | N/A | N/A |

FIG. 4B

| | Sub Log Type | Job Status | Job Name | End Time | User Name | Sheet | Impression | Copies | Automatic Image Overwrite Status | Send File Size | Media Path | Color | Paper Size | Paper Type |
|---|---|---|---|---|---|---|---|---|---|---|---|---|---|---|
| | ENUM | X(..) | X(..) | HH:MM:SS | X(..) | U32 | U32 | U32 | ENUM | U32 | ENUM | ENUM | ENUM | ENUM |
| Job Log / Print | LOG_SUBTYPE_JOB_PRINT_NORMAL "Normal Print" | Completed, Canceled | Job Name in PJL command of print job | End Time HH:MM:SS | User Name | Sheet Counts | Impression Counts | Copy Counts | "Not Support", "IIO_Off", "IIO_Overwriting", "IIO_Success", "IIO_Fail" | N/A | "Simplex ADF", "Duplex ADF", "Flat bed" | "Mono", "Color", | Paper Size | Paper Type |
| | LOG_SUBTYPE_JOB_PRINT_PROOF "Proof Print" | | | | | | | | | N/A | | | | |
| | LOG_SUBTYPE_JOB_PRINT_CONFIDENTIAL "Confidential Print" | | | | | | | | | N/A | | | | |
| | LOG_SUBTYPE_JOB_PRINT_STORE "Stored Print" | | | | | | | | | N/A | | | | |
| | LOG_SUBTYPE_JOB_PRINT_SPOOL "Spool Print" | | | | | | | | | N/A | | | | |
| | LOG_SUBTYPE_JOB_PRINT_PRINTSCHEDULE "Scheduled Print" | | | | | | | | | N/A | | | | |
| | LOG_SUBTYPE_JOB_PRINT_REPORT "Report Print" | | Job Type+ Job No | | | | | | | N/A | | | | |

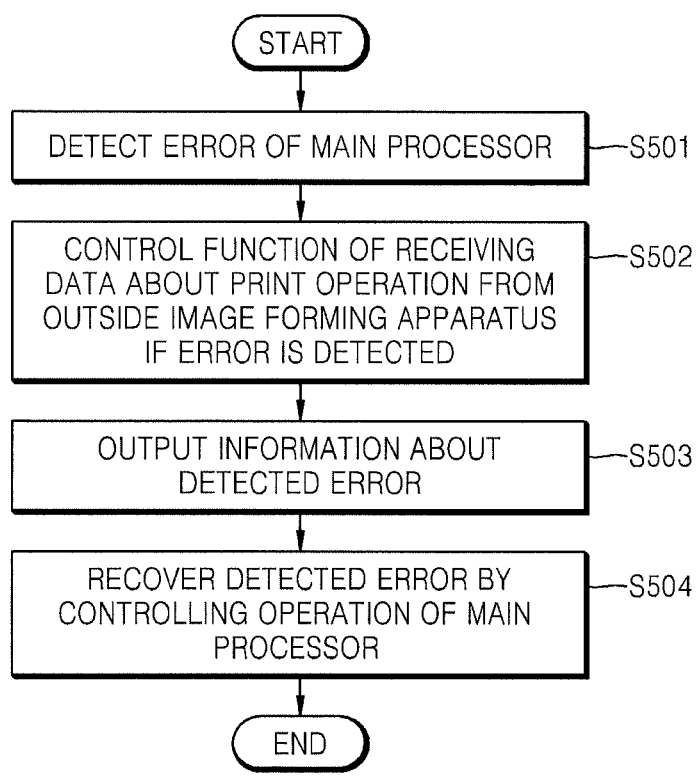

IMAGE FORMING APPARATUS AND METHOD OF PERFORMING ERROR NOTIFICATION AND ERROR RECOVERY FUNCTIONS IN IMAGE FORMING APPARATUS

CROSS-REFERENCE TO RELATED PATENT APPLICATION

This application claims the benefit of Korean Patent Application No. 10-2011-0138487, filed on Dec. 20, 2011, in the Korean Intellectual Property Office, the disclosure of which is incorporated herein in its entirety by reference.

BACKGROUND OF THE INVENTION

1. Field of the Invention

The present disclosure relates to an image forming apparatus and a method of performing error notification and error recovery functions in an image forming apparatus.

2. Description of the Related Art

Image forming apparatuses denote office automation equipment, such as printers, copy machines, scanners, and facsimile machines, which perform at least one function of printing, copying, scanning, and sending a fax. Recently, a multi-function product (MFP) in which functions performed by office automation equipment, such as a printer, a scanner, a copy machine, and a facsimile machine, are combined to one is being widely supplied. Since several functions of printing, copying, scanning, and sending a fax are combined in the MFP, if an error is generated in any function, other functions of the MFP cannot be used. Accordingly, it is important to quickly resolve the error and maintain a normal state.

SUMMARY OF THE INVENTION

The present disclosure provides an image forming apparatus and a method of performing error notification and error recovery functions in an image forming apparatus.

Additional aspects will be set forth in part in the description which follows and, in part, will be apparent from the description, or may be learned by practice of the presented embodiments.

According to an aspect of the present disclosure, there may be provided a method of performing error notification and error recovery functions in an image forming apparatus, the method possibly including: detecting an error of a main processor for controlling sub-processors, in at least one of the sub-processors each controlling one or more units included in the image forming apparatus; if the error is detected, controlling a function of receiving data about a printing operation from outside the image forming apparatus; outputting information about the detected error; and recovering the detected error by controlling an operation of the main processor.

According to another aspect of the present disclosure, there is provided a computer readable recording medium having recorded thereon a program for executing the method.

According to another aspect of the present disclosure, there may be provided an image forming apparatus having error notification and error recovery functions, the image forming apparatus possibly including: a plurality of sub-processors for each controlling one or more unit included in the image forming apparatus; and a main processor for controlling the plurality of sub-processors, wherein at least one of the plurality of sub-processors may include: an error detector for detecting an error generated in the main processor; an interface controller for controlling a function of receiving data about a printing operation from outside the image forming apparatus, if the error is detected; an error notification unit for outputting information about the detected error; and an error recovery unit for recovering the detected error by controlling an operation of the main processor.

BRIEF DESCRIPTION OF THE DRAWINGS

These and/or other aspects and advantages will become apparent and more readily appreciated from the following description of the embodiments, taken in conjunction with the accompanying drawings of which:

FIGS. 4A and 4B are diagrams illustrating logs stored in a hard disk drive (HDD), according to embodiments of the present disclosure; and FIG. 5 is a flowchart illustrating a method of performing error notification and error recovery functions in an image forming apparatus, according to an embodiment of the present disclosure.

DETAILED DESCRIPTION OF THE INVENTION

The present disclosure will now be described more fully with reference to the accompanying drawings, in which exemplary embodiments of the present disclosure are shown.

Figure 1:
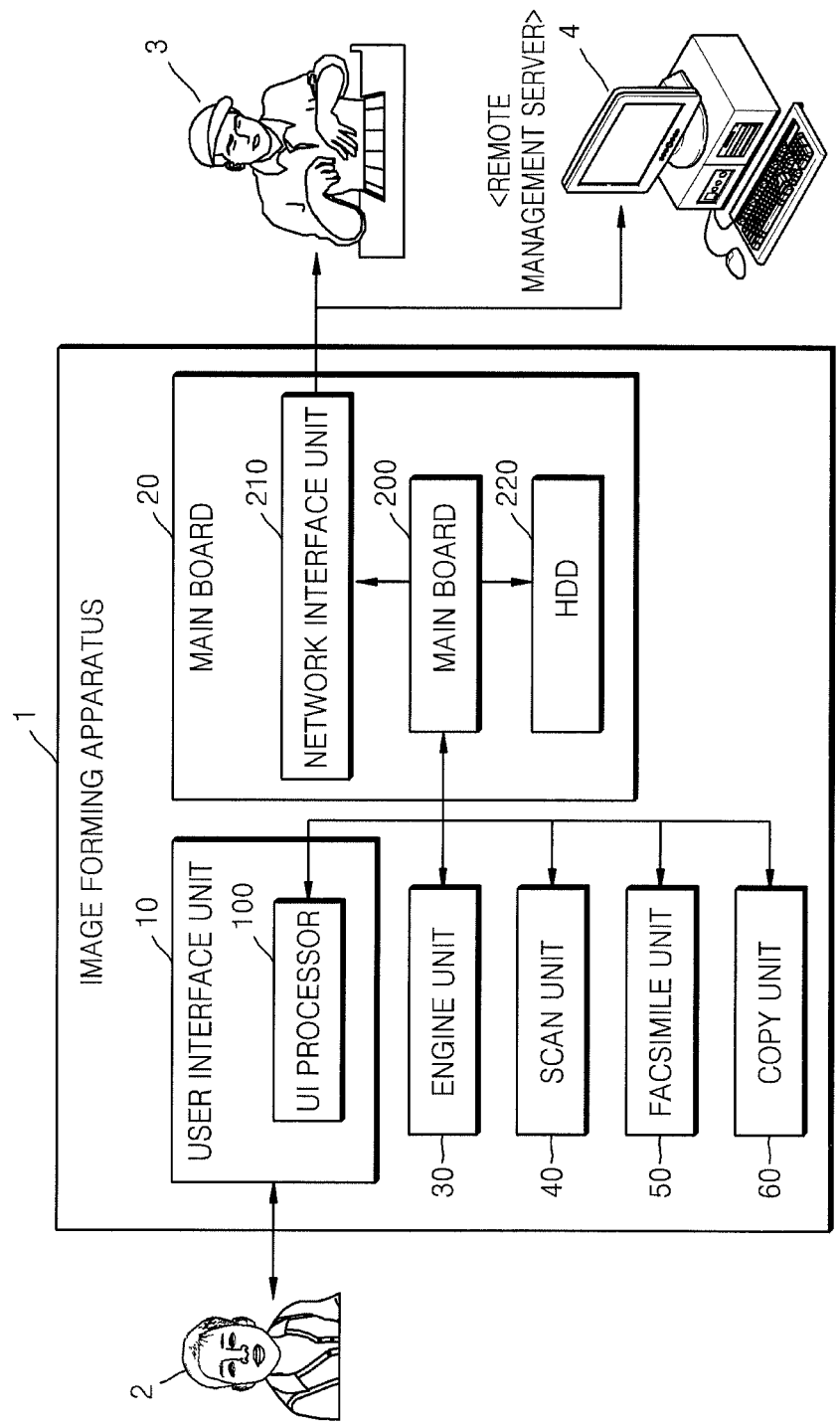
FIG. 1 is a block diagram of an image forming apparatus according to an embodiment of the present disclosure.

FIG. 1 is a block diagram of an image forming apparatus 1 according to an embodiment of the present. Referring to FIG. 1, the image forming apparatus 1 may include a user interface unit 10, a main board 20, an engine unit 30, a scan unit 40, a facsimile unit 50, and a copy unit 60. The user interface unit 10 may include a user interface (UI) processor 100, and the main board 20 may include a main processor 200, a network interface unit 210, and a hard disk drive (HDD) 220. FIG. 1 only shows hardware components related to the current embodiment so as to prevent characteristics of the current embodiment from being blurred. However, it would be obvious to one of ordinary skill in the art that the image forming apparatus 1, the user interface unit 10, or the main board 20 according to the current embodiment may include other general-use hardware components in addition to those shown in FIG. 1.

The image forming apparatus 1 may correspond to an individual apparatus, such as a printer, a scanner, or a facsimile machine, or a multi-function product (MFP) in which functions of copying, printing, scanning, transmitting and receiving a fax, transmitting an email, etc. are performed. For convenience of description, the image forming apparatus is an MFP, but the current embodiment is not limited thereto.

Referring to FIG. 1, a state of the image forming apparatus 1 may be managed by a manager 3 or a remote management server 4. Here, the manager 3 may manage the state of the image forming apparatus 1 by using a terminal device, such as a computer or a portable terminal, connected to the network interface unit 210 via a network. Alternatively, the manager 3 may manage the state of the image forming apparatus 1 by connecting to the remote management server 4.

For example, the manager 3 or the remote management server 4 may manage the state of the image forming apparatus 1 by using a printing account solution. The printing account solution may be a solution of collecting operation information of the current image forming apparatus 1, such as a printer or an MFP, by connecting to the image forming apparatus 1 via a network.

The printing account solution may analyze the collected operation information to determine whether the image forming apparatus 1 is operating normally or determine whether an error, if generated, is to be urgently processed and an action is to be taken to process the error. In other words, if an error is generated in the image forming apparatus 1, the printing account solution may determine whether the error needs to be recovered by using the manager 3 or the remote management server 4. That is, the printing account solution may be a solution of continuously managing the image forming apparatus 1 by analyzing an operation state of the image forming apparatus 1 in real-time.

Specifically, the image forming apparatus 1 according to the current embodiment may include, as well as the main board 20, other boards, such as the user interface unit 10, the engine unit 30, the scan unit 40, the facsimile unit 50, and a copy unit 60, included in the image forming apparatus 1.

In detail, the user interface unit 10 may control a user interface function for a user 2 to manipulate the image forming apparatus 1. The engine unit 30 may control a function, such as a printing engine, included in the image forming apparatus 1. The scan unit 40 may control a scanner function of the image forming apparatus 1, which may generate an image file by scanning a document. The facsimile unit 50 may control a facsimile function of the image forming apparatus 1, which may generate an image by using facsimile data received from outside the image forming apparatus 1. The copy unit 60 may control a copy function of the image forming apparatus 1, which may generate a copy image of a document to be copied and may output the copy image.

The main board 20 may control other boards, such as the user interface unit 10, the engine unit 30, the scan unit 40, the facsimile unit 50, and the copy unit 60. In other words, the main board 20 may generate an image to be printed by the image forming apparatus 1 while also possibly playing a pivotal role for controlling an entire system of the image forming apparatus 1. Specifically, as described above, the network interface unit 210 including a wired/wireless network interface card, and the HDD 220 may be installed in the main board 20.

The main board 20 according to the current embodiment may include the main processor 200 possibly controlling an operation of the main board 20. Also, the user interface unit 10 may include the UI processor 100 possibly controlling a user interfacing operation of the user interface unit 10. Similarly, other boards, such as the engine unit 30, the scan unit 40, the facsimile unit 50, and the copy unit 60, also respectively may include sub-processors, such as the UI processor 100, but the sub-processors are not shown in FIG. 1 for convenience of description.

The main processor 200 may communicate with the sub-processors to transmit a control command of the main processor 200 to the sub-processors, and the sub-processors may be controlled by the control command to control functions of each unit. As such, overall operations and functions of the image forming apparatus 1 may be performed.

A general main processor may detect an error by checking a state of each unit, and if an error is generated in a function of each unit, the general main processor may notify the error to a user, a manager, or a remote management server, and may recover the error according to a recovery command. However, if an error is generated in the general main processor, a function of notifying or recovering the error may not be performed, and thus an entire function of an image forming apparatus may not be performed. Specifically, if a user transmits print data to the image forming apparatus, the image forming apparatus having the error may not process the print data, and thus the print data of the user may be lost.

However, in the image forming apparatus 1 according to the current embodiment, even if an error is generated in the main processor 200 or the main board 20, the sub-processors included in other units may detect, notify, and recover the error of the main processor 200 or the main board 20. Operations and functions of a sub-processor processing the error of the main processor 200 or the main board 20 will now be described in detail. For convenience of description, only the UI processor 100 included in the user interface unit 10 is described from among the sub-processors included in the image forming apparatus 1, but it would be obvious to one of ordinary skill in the art that the following description may apply to other units, i.e., the sub-processors included in the engine unit 30, the scan unit 40, the facsimile unit 50, and the copy unit 60.

Figure 2:
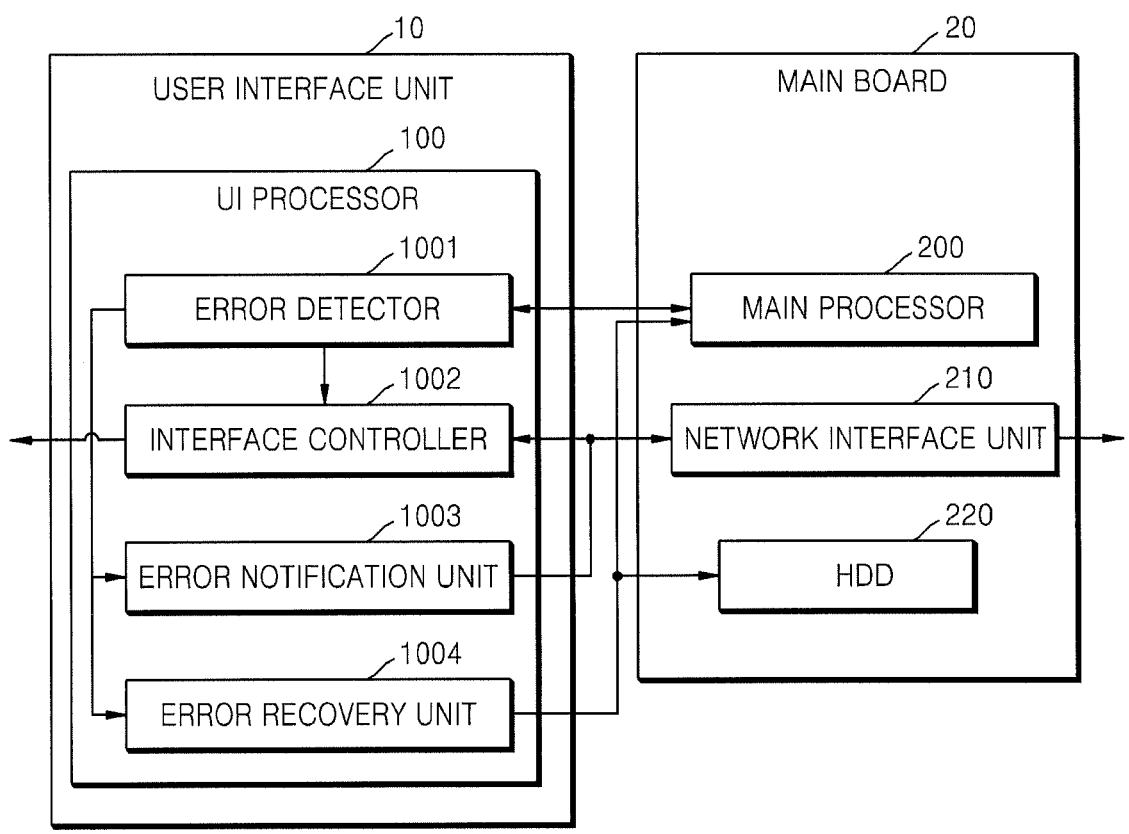
FIG. 2 is a block diagram illustrating in detail a user interface unit and a main board, according to an embodiment of the present disclosure.

FIG. 2 is a block diagram illustrating in detail the user interface unit 10 and the main board 20, according to an embodiment of the present disclosure. Referring to FIG. 2, the user interface unit 10 may include the UI processor 100, which is one of the sub-processors. The UI processor 100 may include an error detector 1001, an interface controller 1002, an error notification unit 1003, and an error recovery unit 1004.

Here, the UI processor 100 and the main processor 200 may each be realized in an array of a plurality of logic gates, or a general-use micro-processor. In other words, it would be obvious to one of ordinary skill in the art that the UI processor 100 and the main processor 200 may be realized in any form of hardware. Also, only components related to the current embodiment are shown in FIG. 2 to prevent characteristics of the current embodiment from being blurred. However, it would be obvious to one of ordinary skill in the art that the user interface unit 10, the main board 20, and the UI processor 100 may include other general-use hardware components, as well as those shown in FIG. 2.

The error detector 1001 may detect an error generated in the main processor 200. Upon communicating with the main processor 200 in a predetermined protocol, the error detector 1001 may determine that an error may be generated if the main processor 200 does not respond for a predetermined time. Alternatively, the error detector 1001 may determine that an error may be generated if data including an error message is transmitted from the main processor 200.

Generally, the main processor 200 and the UI processor 100 may communicate with each other by transmitting and receiving data according to a predetermined protocol. In other words, the main processor 200 may transmit an operation command to the UI processor 100, and the UI processor 100 may transmit back a process result of the operation command to the main processor 200. Since such a process is well known to one of ordinary skill in the art, details thereof are not described herein.

Figure 3A:
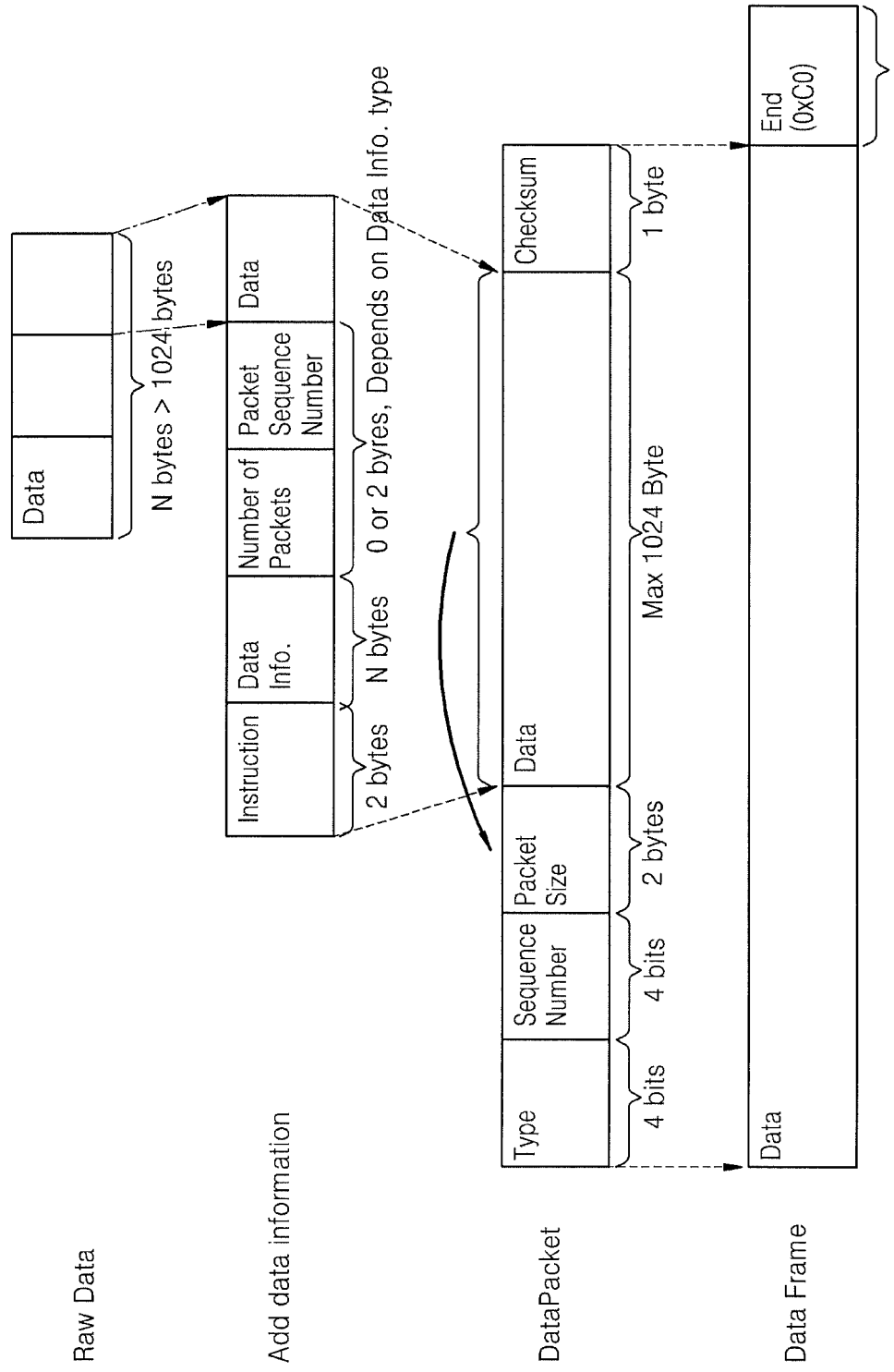
FIGS. 3A and 3B are diagrams illustrating data packets transmitted and received between a user interface unit and a main processor according to a predetermined protocol.
Figure 3B:
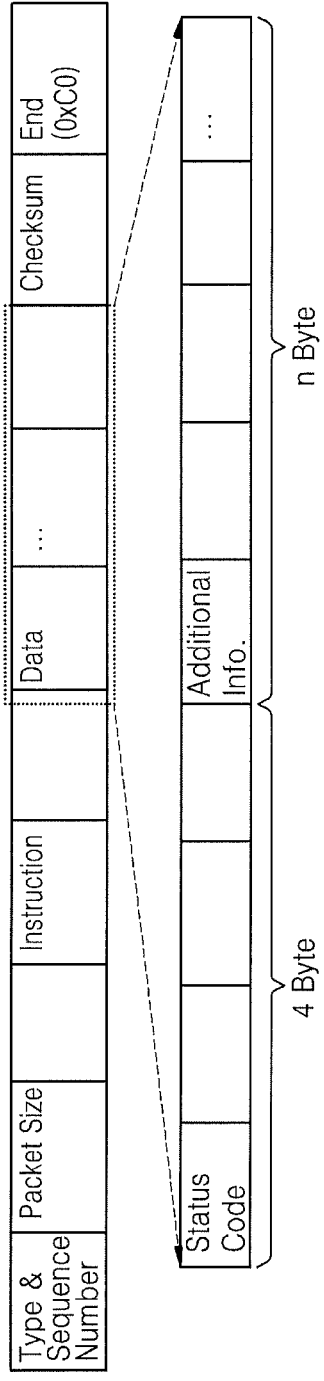

FIGS. 3A and 3B are diagrams illustrating data packets transmitted and received between the user interface unit 10 and the main processor 200 according to a predetermined protocol.

Referring to FIGS. 3A and 3B, the main processor 200 may transmit a data packet including data about an operation to be performed by the user interface unit 10 according to a predetermined protocol, and the UI processor 100 may analyze the data packet to control an operation of the user interface unit 10.

Figure 3C:
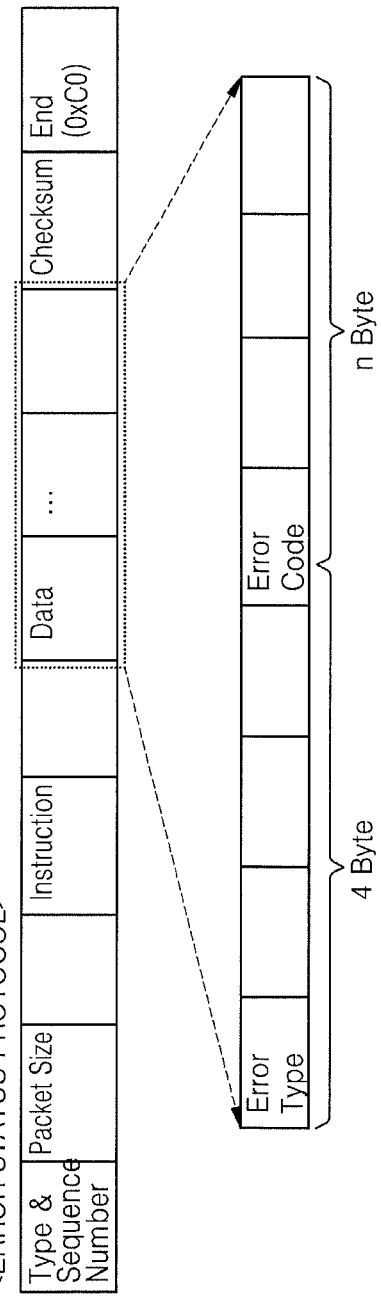
FIG. 3C is a diagram illustrating a data packet including an error message, according to an embodiment of the present disclosure.

FIG. 3C is a diagram illustrating a data packet including an error message, according to an embodiment of the present disclosure. Referring to FIG. 3C, the error detector 1001 may receive a data packet including information about an error type and an error code from the main processor 200, and upon receiving the data packet the error detector 1001 may determine that an error may be generated in the main processor 200. However, since a component such as the error detector 1001 may not be included in conventional sub-processors, such as a UI processor, the sub-processors may not detect an error even by receiving the data packet including information about an error type and an error code from a main processor.

Here, unlike FIG. 3C, the error detector 1001 may determine that an error may be generated if the main processor 200 does not respond for a predetermined time after communicating with the main processor 200 in a predetermined protocol.

The types of data packets and the information illustrated in the data packets described with reference to FIGS. 3A through 3C are only examples, and the embodiments are not limited thereto.

Referring back to FIG. 2, the interface controller 1002 may control a function of receiving data about a print operation from outside the image forming apparatus 1, if an error is detected. In other words, the interface controller 1002 may control at least one of the user interface unit 10 and the network interface unit 210. In detail, the interface controller 1002 may deactivate at least one of a function of receiving data about a print operation from the user 2 through the user interface unit 10, and a function of receiving data about a print operation from an external network connected to a personal computer (PC) or a laptop of the user 2 through the network interface unit 210.

As described above, print data of the user may not be processed by a conventional image forming apparatus and lost, since the user is not aware of an error generated in the conventional image forming apparatus and continuously transmits the print data.

However, the interface controller 1002 may deactivate the function of the user interface unit 10 if an error is detected, and thus may prevent the user 2 from performing the print operation in the image forming apparatus 1 having the error through the user interface unit 10. Alternatively, the interface controller 1002 may deactivate the function of the network interface unit 210 if an error is detected, and thus may prevent print data transmitted from the user 2 to the image forming apparatus 1 having the error from not being processed.

The error notification unit 1003 may notify the error of the image forming apparatus 1 to the outside the image forming apparatus 1 by controlling at least one of the user interface unit 10 and the network interface unit 210.

In other words, the error notification unit 1003 may output information about the error to the user 2 by displaying the information through the user interface unit 10. Alternatively, the error notification unit 1003 may output the information by transmitting the information to the external network through the network interface unit 210. Here, the external network may denote a network connected to at least one of a terminal device used by the user 2, a terminal network used by the manager 3, and the remote management server 4.

According to an embodiment, the error notification unit 1003 may output the information by preparing an email including the information and transmitting the email to the external network, such as the terminal device of the user 2, the terminal device of the manager 3, or the remote management server 4, through the network interface unit 210.

According to another embodiment, the error notification unit 1003 may output the information by transmitting the information to the external network, such as the terminal device of the user 2, the terminal device of the manager 3, or the remote management server 4 by using a simple network management protocol (SNMP) trap method.

The error recovery unit 1004 may recover the error by controlling an operation of the main processor 200.

During an operation of the image forming apparatus 1, the main processor 200 may process operations about application programs about functions of the image forming apparatus 1, and application programs based on an open architecture. For example, the main processor 200 may perform various application programs, such as an engine control application program, a user interface control application program, a network interface control application program, an image forming control application program, a scan data processing application program, an address book application program, and a document box application program.

If an error is generated in at least one of such application programs performed by the main processor 200, the error recovery unit 1004 may recover from the error by controlling an operation of the main processor 200 to end and rerun the at least one application program having the error. Alternatively, the error recovery unit 1004 may control an operation of the main processor 200 to reboot the main processor 200, thereby recovering from the error. Alternatively, the error recovery unit 1004 may recover from the error generated in the main processor 200 by using a well known method.

However, the error of the main processor 200 may in some circumstances not be recovered even by an error recovery function of the error recovery unit 1004.

If the error is not recovered, the error recovery unit 1004 may store a log indicating the information about the error in the HDD 220. The stored log may include information about the overall system of the image forming apparatus 1, the information about the error, etc.

FIGS. 4A and 4B are diagrams illustrating logs stored in the HDD 220, according to embodiments of the present disclosure.

FIG. 4A illustrates an A level log of the image forming apparatus 1. Referring to FIG. 4A, the A level log to be stored in the HDD 220 may include logs indicating where, what, when, who, and how attributes about functions supported by the image forming apparatus 1, such as printing, copying, scanning, and sending a fax.

FIG. 4B illustrates a B level log of the image forming apparatus 1. Referring to FIG. 4B, the B level log to be stored in the HDD 220 may indicate internal design information of software for realizing the functions supported by the image forming apparatus 1, such as printing, copying, scanning, and sending a fax. In other words, the B level log to be stored in the HDD 220 may include logs indicating information about a sub job type, a job name, a time, and a count.

Referring back to FIG. 2, if the error is not recovered, the error recovery unit 1004 may store the logs indicating the information about the entire system of the image forming apparatus 1, the information about the error, etc. in the HDD 220, so as to provide the information about the error to the manager 3, the remote management server 4, or an after service (AS) expert to determine and recover the error.

Here, the logs stored in the HDD 220 may be displayed through the user interface unit 10 according to a request of the manager 3, the remote management server 4, or the AS expert. Alternatively, the logs stored in the HDD 220 may be transmitted to the external network through the network interface unit 210.

As described above, even if the error is generated in the main processor 200, the sub-processors, such as the UI processor 100, included in the image forming apparatus 1 may detect and recover the error, and thus the image forming apparatus 1 may be continuously used and managed. Also, by deactivating an interface function of the image forming apparatus 1 having an error, the print data of the user 2 may not be lost.

In the current embodiment, the UI processor 100 of the user interface unit 10 is used, but it would be obvious to one of ordinary skill in the art that the error of the main processor 200 may be detected and recovered in the same manner by other processors including the error detector 1001, the interface controller 1002, the error notification unit 1003, and the error recovery unit 1004 of the UI processor 100.

FIG. 5 is a flowchart illustrating a method of performing error notification and error recovery functions in the image forming apparatus 1, according to an embodiment of the present disclosure. Referring to FIG. 5, the method according to the current embodiment may include operations that are performed in the image forming apparatus 1, the user interface unit 10, and the main board 20 of FIGS. 1 and 2, in time series. Thus, descriptions about FIGS. 1 and 2 are applied to the method even if they are omitted.

In operation S501, the error detector 1001 may detect an error of the main processor 200.

In operation S502, if the error is detected, the interface controller 1002 may control the function of receiving data about the print operation from outside the image forming apparatus 1.

In operation S503, the error notification unit 1003 may output the information about the detected error.

In operation 504, the error recovery unit 1004 may recover the detected error by controlling an operation of the main processor 200.

According to the embodiments of the present disclosure, even if an error is generated in the main processor of the image forming apparatus including a plurality of processors, the error may be detected and recovered by controlling the sub-processors, and thus the image forming apparatus may be continuously used and managed. Also, by deactivating the interface function of the image forming apparatus having the error, the print data of the user may not be lost. In other words, the convenience of the user may be promoted by quickly determining and recovering the error.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method by an image forming apparatus including a plurality of sub-processors for controlling operations of the image forming apparatus according to operation data to be received from a user, and a main processor to control the plurality of sub-processors by responding to at least one data packet from the plurality of sub-processors according to the operation data to be received from the user, the method comprising:
   detecting an error of the main processor by at least one sub-processor from among the plurality of sub-processors, by determining that the main processor does not respond to one of the at least one data packet from the at least one sub-processor within a predetermined time; and
   in response to the detecting the error, by the at least one sub-processor:
      deactivating a function of receiving the operation data to be received from the user through a user interface or from an external network through a network interface of the image forming apparatus;
      outputting information about the detected error; and
      recovering the image forming apparatus from the detected error by controlling the main processor to:
         cause the main processor to reboot, or
         cause an application program being executed by the main processor to end followed by re-executing the application program.

2. The method of claim 1, wherein the at least one sub-processor is a sub-processor that controls an operation of the user interface.

3. The method of claim 1, wherein the deactivating the function of receiving the operation data comprises deactivating the interface function according to control of the at least one sub-processor.

4. The method of claim 1, wherein the outputting the information about the detected error comprises displaying the information about the detected error through the user interface according to control of the at least one sub-processor.

5. The method of claim 1, wherein the outputting the information about the detected error comprises transmitting the information about the detected error to the external network through the network interface unit according to control of the at least one sub-processor, wherein the external network is connected to at least one of a terminal device used by the user, a terminal device used by a manager of the image forming apparatus, and a remote management server for remotely managing the image forming apparatus.

6. The method of claim 5, wherein the outputting the information about the detected error comprises transmitting an email comprising the information to an external server.

7. The method of claim 5, wherein the outputting the information about the detected error comprises transmitting the information to the external network by using a simple network management protocol (SNMP) trap method.

8. The method of claim 1, wherein the recovering the image forming apparatus from the detected error by controlling the main processor comprises recovering the detected error by ending and rerunning a process in which the error is detected in the main processor, according to control of the at least one sub-processor.

9. The method of claim 1, further comprising, in response to the detected error not being recovered as a result of the recovering the image forming apparatus from the detected error by controlling the main processor, storing a log showing the information about the detected error.

10. The method of claim 9, further comprising displaying the stored log through the user interface, according to a control of the at least one sub-processor.

11. The method of claim 9, further comprising transmitting the stored log to the external network through the network interface, according to control of the at least one sub-processor.

12. A non-transitory computer readable recording medium having recorded thereon a program for executing the method of claim 1.

13. The method of claim 1, wherein the main processor communicates with the plurality of sub-processors to transmit at least one control command of the main processor to the plurality of sub-processors, and the plurality of sub-processors are controlled by the at least one control command to control functions of each hardware unit.

14. An image forming apparatus having error notification and error recovery functions, the image forming apparatus comprising:
a plurality of sub-processors included in the image forming apparatus and controlling one or more hardware units included in the image forming apparatus according to operation data to be received from a user; and
a main processor included in the image forming apparatus to control the plurality of sub-processors by responding to at least one data packet from the plurality of sub-processors according to the operation data to be received from the user,
wherein at least one sub-processor from among the plurality of sub-processors is configured to:
detect an error generated in the main processor by determining that the main processor does not respond to one of the at least one data packet from the at least one sub-processor within a predetermined time,
in response to the at least one sub-processor detecting the error generated in the main processor:
deactivate a function of receiving the operation data to be received from the user through a user interface or from an external network through a network interface of the image forming apparatus,
output information about the detected error, and
recover the image forming apparatus from the detected error by controlling the main processor, to:
cause the main processor to reboot, or
cause an application program being executed by the main processor to end followed by re-executing the application program.

15. The image forming apparatus of claim 14, wherein the at least one sub-processor of the plurality of sub-processors comprises a sub-processor that controls an operation of the user interface.

16. The image forming apparatus of claim 14, wherein the at least one sub-processor outputs the information about the detected error by controlling at least one of the user interface and the network interface so that the information is displayed through the user interface or transmitted to the external network through the network interface.

17. The image forming apparatus of claim 14, wherein the at least one sub-processor recovers the error by ending and rerunning in the main processor a process in which the error is detected.

18. The image forming apparatus of claim 14, further comprising a storage for storing a log indicating the information about the detected error when the image forming apparatus is not recovered from the detected error by the at least one sub-processor.

* * * * *